United States Patent
Carson

(10) Patent No.: US 7,778,823 B2
(45) Date of Patent: *Aug. 17, 2010

(54) PRE-PROCESSING INDIVIDUAL AUDIO ITEMS IN A MEDIA PROJECT IN ORDER TO IMPROVE REAL-TIME PROCESSING OF THE MEDIA PROJECT

(75) Inventor: Kenneth M. Carson, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/963,754

(22) Filed: Dec. 21, 2007

(65) Prior Publication Data

US 2008/0154407 A1   Jun. 26, 2008

Related U.S. Application Data

(63) Continuation of application No. 10/666,467, filed on Sep. 19, 2003, now Pat. No. 7,333,934.

(60) Provisional application No. 60/505,347, filed on Apr. 6, 2003.

(51) Int. Cl.
   *G10L 21/00*   (2006.01)
(52) U.S. Cl. ............... 704/200; 704/278; 704/500; 715/201; 715/202; 345/619
(58) Field of Classification Search ........... 704/200, 704/278, 500; 715/201, 202; 345/619
   See application file for complete search history.

(56) References Cited

U.S. PATENT DOCUMENTS

| | | | |
|---|---|---|---|
| 5,892,507 A * | 4/1999 | Moorby et al. | 715/205 |
| 5,940,573 A * | 8/1999 | Beckwith | 386/54 |
| 6,714,826 B1 | 3/2004 | Curley et al. | |
| 6,816,833 B1 | 11/2004 | Iwamoto et al. | |
| 7,225,405 B1 * | 5/2007 | Barrus et al. | 715/716 |
| 2002/0171668 A1 * | 11/2002 | Samra | 345/619 |
| 2003/0146927 A1 * | 8/2003 | Crow et al. | 345/716 |
| 2003/0171935 A1 | 9/2003 | Kawamura et al. | |
| 2004/0088169 A1 * | 5/2004 | Smith et al. | 704/500 |
| 2005/0015769 A1 * | 1/2005 | Gegner | 718/104 |

OTHER PUBLICATIONS

Notice of Allowance of U.S. Appl. No. 10/666,467, mailing date Sep. 14, 2007, Carson, which issued as US Patent 7,333,934.

Non-Final Office Action of U.S. Appl. No. 10/666,467, mailing date Mar. 2, 2007, Carson, which issued as US Patent 7,333,934.

\* cited by examiner

*Primary Examiner*—Daniel D Abebe
(74) *Attorney, Agent, or Firm*—Adeli & Tollen LLP

(57) ABSTRACT

Some embodiments of the invention provide a method of processing audio data while creating a media presentation. The media presentation includes several audio streams. The method processes a section of a first audio stream and stores the processed section of the first audio stream. The method also processes a section of a second audio stream that overlaps with the processes section of the first audio stream. The method then processes the section of the second audio stream independently of the first audio stream. In some embodiments, the method processes the first audio stream section by applying an effect to the first audio stream section. Also, in some embodiments, the processing of the first audio stream section also entails performing a sample rate conversion on the first audio stream section.

33 Claims, 13 Drawing Sheets

PRE-PROCESSING INDIVIDUAL AUDIO ITEMS IN A MEDIA PROJECT IN ORDER TO IMPROVE REAL-TIME PROCESSING OF THE MEDIA PROJECT

CLAIM OF BENEFIT

This application is a continuation application of U.S. patent application Ser. No. 10/666,467 filed Sep. 19, 2003 now U.S. Pat. No. 7,333,934, entitled "Pre-Processing Individual Audio Items in a Media Project in Order to Improve Real-Time Processing of the Media Project", which claims benefit to the U.S. Provisional Patent Application 60/505,347, entitled "Method and Apparatus for Pre-Processing Individual Audio Items in a Media Project in Order to Improve Real-Time Processing of the Media Project," filed Apr. 6, 2003. Both application Ser. No. 10/666,467 and 60/505,347 are incorporated herein by reference.

FIELD OF THE INVENTION

The present invention is directed towards pre-processing individual audio items in a media project in order to improve real-time processing of the media project.

BACKGROUND OF THE INVENTION

There are numerous multi-media editing applications today for editing and creating multimedia presentations. Examples of such applications include Final Cut Pro® and iMovie®, both sold by Apple Computer, Inc. Multi-media editing applications allow a user to prepare a multi-media presentation by combining several video clips and audio items. They often allow the user to combine video and audio effects with imported video clips and audio items in order to enhance the multi-media presentation.

These applications often provide the user with several digital signal processing ("DSP") operations. The user can then select a DSP operation to apply an audio effect to an audio item that the user designates. These applications also provide DSP operations for adjusting the sample rate of an audio item. In this document, DSP operations and DSP's that apply an audio effect to an audio item are called filter operations and filters, while DSP operations and DSP's that adjust the sample rate of an audio item are called sample rate conversion ("SRC") operations and sample rate converters. Media editing application at times also provide the user with a mixer that allows the user to specify the volume level and pan (where pan is the audio distribution among different channels) of the audio items.

In media editing applications, it is often desirable to allow the user to process the composed media in real time, since real-time processing allow a user to instantaneously gauge the effect that can be achieved by adjusting certain parameters, and hence is an important part of the creative process. However, real-time processing often becomes more difficult as the user adds more content and specifies more DSP and mixing operations. Often, real-time processing is impossible once the user adds a few tracks and operations, since audio and video processing is quite intensive, and this processing becomes more intensive as DSP and mixing operations are added.

Therefore, there is a need to reduce real-time transactions in order to allow the user to have some real-time processing capabilities. FIG. 1 illustrates one prior art way for reducing the number of real-time transactions. The approach shown in this figure is called sequence level rendering. This figure illustrates the processing 115 of several audio tracks 1 to N. This processing entails retrieving audio data from a source file, performing any necessary sample rate conversion, and applying any necessary filter operations. After this processing for each track, a mixer 105 combines the processed data of all the tracks and assigns the combined data to different audio channels (e.g., left and right for a stereo presentation) while accounting for the appropriate volume and pan values specified through the mixer. The output of the mixer is then played through the speakers 110.

As illustrated in FIG. 1, sequence level rendering is a preprocess operation that composites the processing of all the tracks and the mixing into one render file 120. By pre-processing all the operations and mixing of the audio tracks, this operation frees up the CPU from having to do these operations in real-time. Hence, the thought behind this approach is to have the user create one render file once the user is satisfied with the settings and arrangement of certain audio items.

However, this approach has several disadvantages. First, the user cannot modify the DSP operations previously specified for a track without discarding the rendering file and re-rendering the tracks 1 to N. Such re-rendering is time consuming, defeats the purpose of preprocessing, and detracts from the creative process. Second, the rendering file produced through sequence level rendering has to be discarded when the user wants to move one of the tracks 1 to N.

Third, the rendering file 120 has to be discarded even when the user moves all of the pre-processed tracks in unison. This is because video and audio data rates are not integer multiples of each other, which requires the audio samples per frame to be uniquely specified based on the position of the frame in the presentation and with respect to the audio data's source file. Sequence level rendering cannot address the issue of the sample count being specifically tailored for the position of the frame in the presentation. Therefore, there is a need in the art for method for pre-processing individual audio items in a media project in order to improve real-time processing of the media project.

SUMMARY OF THE INVENTION

Some embodiments of the invention provide a method of processing audio data while creating a media presentation. The media presentation includes several audio streams. The method processes a section of a first audio stream and stores the processed section of the first audio stream. The method also processes a section of a second audio stream that overlaps with the processes section of the first audio stream. The method then processes the section of the second audio stream independently of the first audio stream. In some embodiments, the method processes the first audio stream section by applying an effect to the first audio stream section. Also, in some embodiments, the processing of the first audio stream section also entails performing a sample rate conversion on the first audio stream section.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
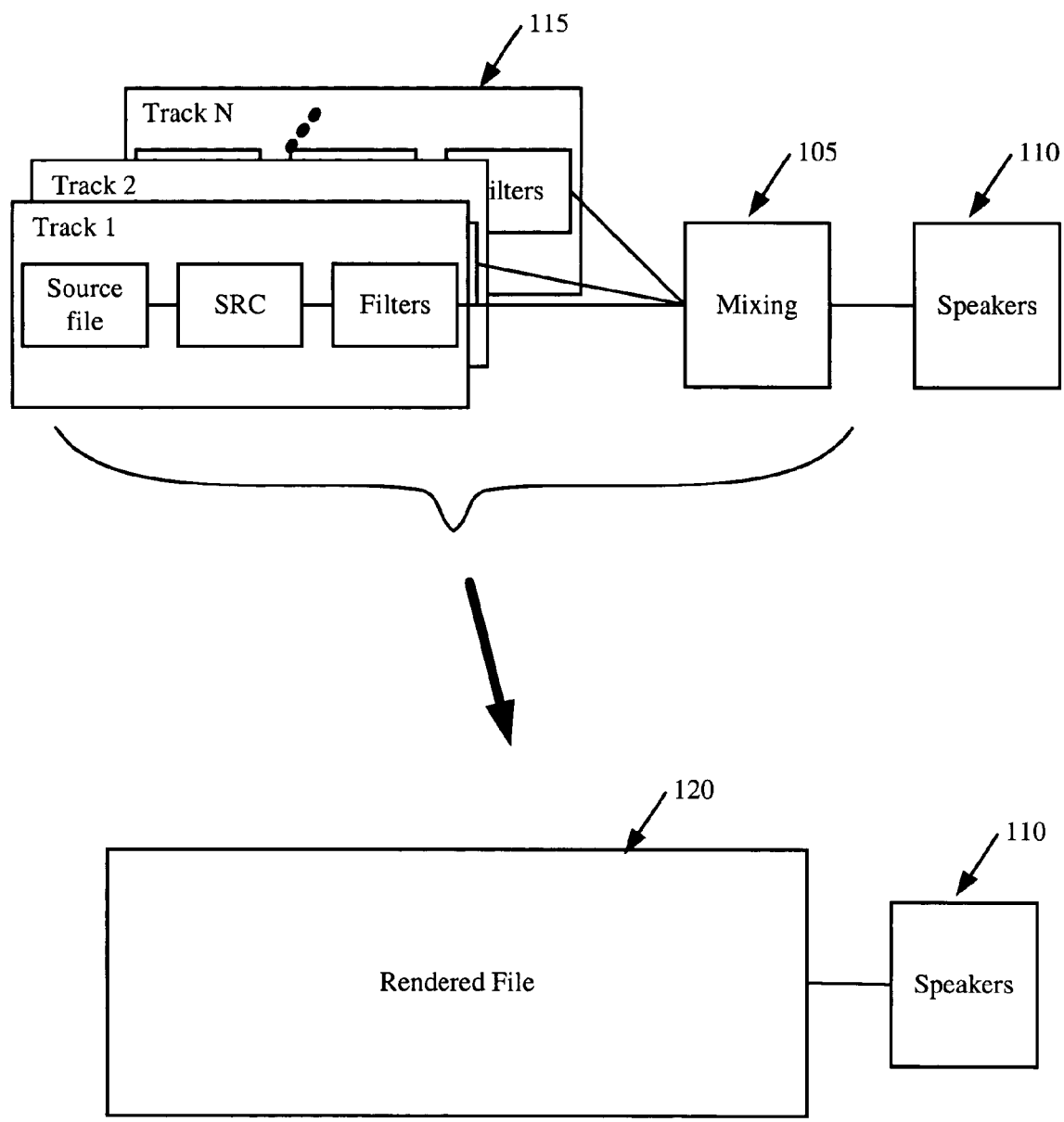
FIG. 1 illustrates one prior art way for reducing the number of real-time transactions.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention are audio-editing applications that pre-process individual audio items in a media project in order to reduce the load of their computer system during real-time processing of the media project. This pre-processing is referred to as item level rendering to distinguish it from sequence level rendering, which is not done on an individual item basis. In some embodiments, the pre-processing (i.e., the item level rendering) can only involve filter and sample rate conversion operations. In other words, the pre-processing never involves the mixing operations. This approach gives the user of the application more flexibility to perform real-time mixing of different audio tracks.

FIGS. 2-8 present one example that illustrates the operation of some embodiments of the invention. Each of these figures presents a graphical user interface ("GUI") of a media-editing application that employs the invention. The GUI images in these figures illustrate a succession of operations that are performed on several audio items.

The GUI has several windows open in each of these figures. Three of these windows are a time bar window 205, a display window 210, and an audio mixer 215. Each of these three windows is identified by its reference numbers in FIG. 2. The time bar window 205 graphically represents video clips and audio bars in terms of bars that span across a horizontal axis that specifies time. For instance, in FIG. 2, the time bar window 205 includes a video bar 220 that represents a video clip entitled DVI.mov, and four pairs of related audio bars 225, 230, 235, and 240 that represent four audio items entitled DVI.mov, Extreme Music, Audio2.mov, and Audio1.mov. The audio item DVI.mov is an audio item associated with the video clip DVI.mov. The other audio items have been added to the project separately from the video clip in this case.

An audio item in this example is a segment of audio from an audio source, and each audio item is assigned to an audio track 242, 244, 246. Also, in the examples illustrated in FIGS. 2-8, each audio item is represented by a related pair of audio bars (e.g., bars 230a and 230b for the audio item Extreme Music), as each track is to be presented in a stereo format. Specifically, for each audio item (e.g., the audio item Extreme Music), one of the related pair of audio bars (e.g., 230a) is for the left speaker, and the other bar (e.g., 230b) is for the right speaker. In the example illustrated in FIG. 2, three of the audio items DVI.mov, Extreme Music, and Audio2.mov overlap. Audio items DVI.mov and Extreme Music completely overlap, and extend past audio item Audio2.mov. Also, the audio item Audio1.mov begins when audio items DVI.mov and Extreme Music finish.

Figure 2:
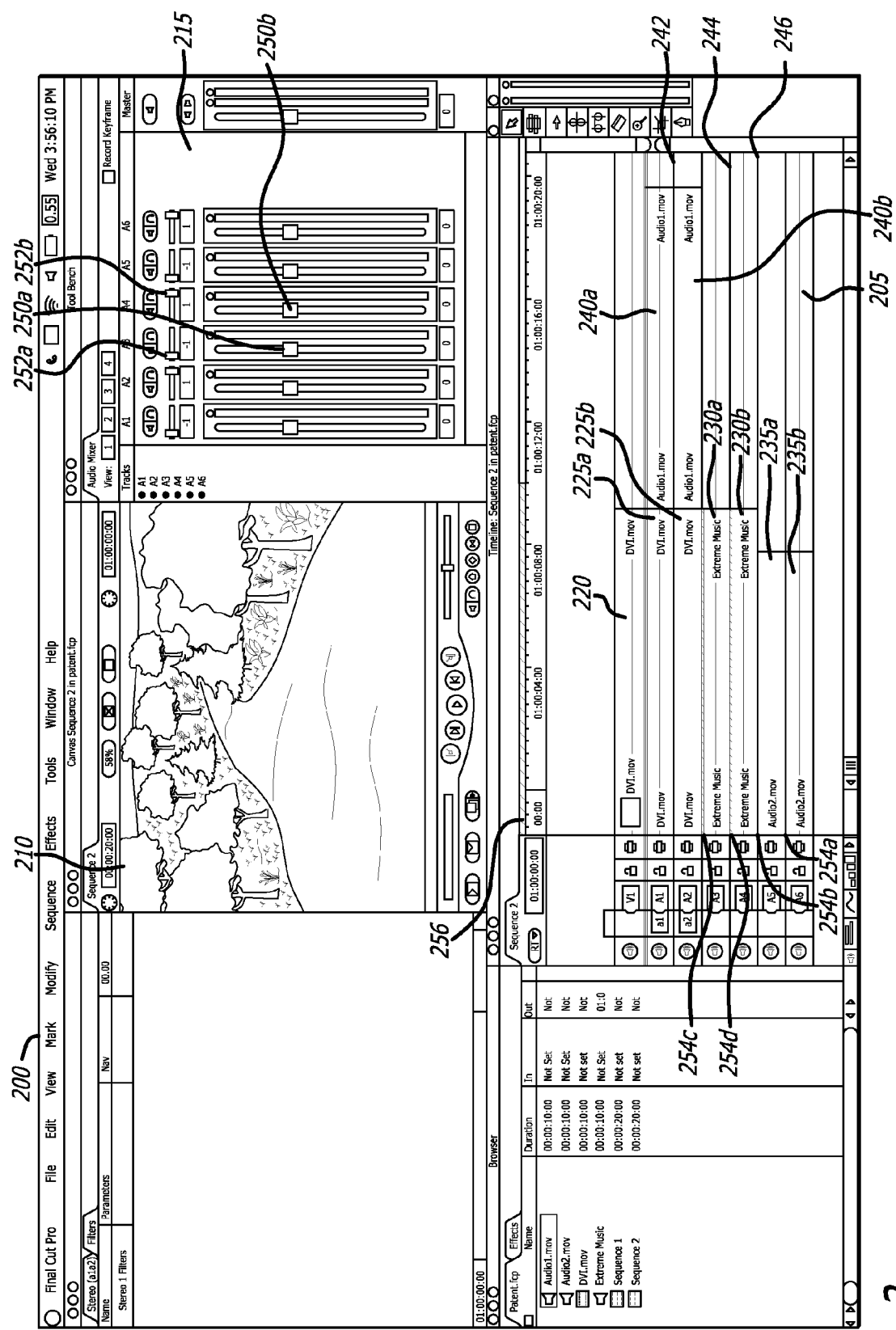
FIGS. 2-8 illustrate one sequence of operations in some embodiments of the invention.

The display window 210 displays at any moment the video content that the user has specified for that instant. As illustrated in FIG. 2, the audio mixer 215 specifies one volume control knob for each channel of a track (e.g., knob 250a for the left channel of track 244 and knob 250b for the right channel of track 244). Each knob slides across a scale that defines different volume levels. Also, above each volume control knob and its scale there is a pan control knob (e.g., pan control knob 252a is above volume control knob 250a). The pan control knob slides across the scale that on one end represents the left speaker and at the other end represents the right speaker. FIG. 2 illustrates the default values of the volume control and pan control knobs.

FIG. 2 also illustrates couple of features in the GUI 200 that pertain to the item level rendering. One such item is the item-level-render bar 254 that appears above each one of the audio item bars. Some embodiments use this bar to specify whether an audio item has been pre-processed, and if so, what portion of the audio item has been pre-processed. As further described below, the item-level-render bar changes to a first color (e.g., changes to dark gray from white or from green) for the portion of the audio item that has been pre-processed. Also, the item-level-render bar changes to a second color (e.g., changes to green from white) when a sample rate conversion has been specified for an audio item. In FIG. 2, the item-level bar 254c and 254d above the audio-item bars 230a and 230b are shown in the second color (e.g., green) to specify that a sample rate conversion has been specified for the audio item Extreme Music. In this example, the Extreme Music audio item is from a CD that has a 44K sampling rate, which does not match the DV medias 48K audio sampling rate.

FIG. 2 also illustrates a render status bar 256 above the time bar window 205. Each time the user makes a modification in the time bar window 205, the media-editing application determines whether at any segment of the time bar (i.e., at any interval in the presentation) the filter and SRC operations specified for the audio items require more processing power than the computer system can provide in real-time. If the application identifies any such segment, the application turns to red each portion of the render status bar 256 that overlaps an identified segment. In this manner, the render status bar alerts the user when the specified operations have likely exceeded the real-time processing power of the computer system, and identifies portions of the presentation where this excess has occurred. The render status bar 256 will be further described below.

Figure 3:
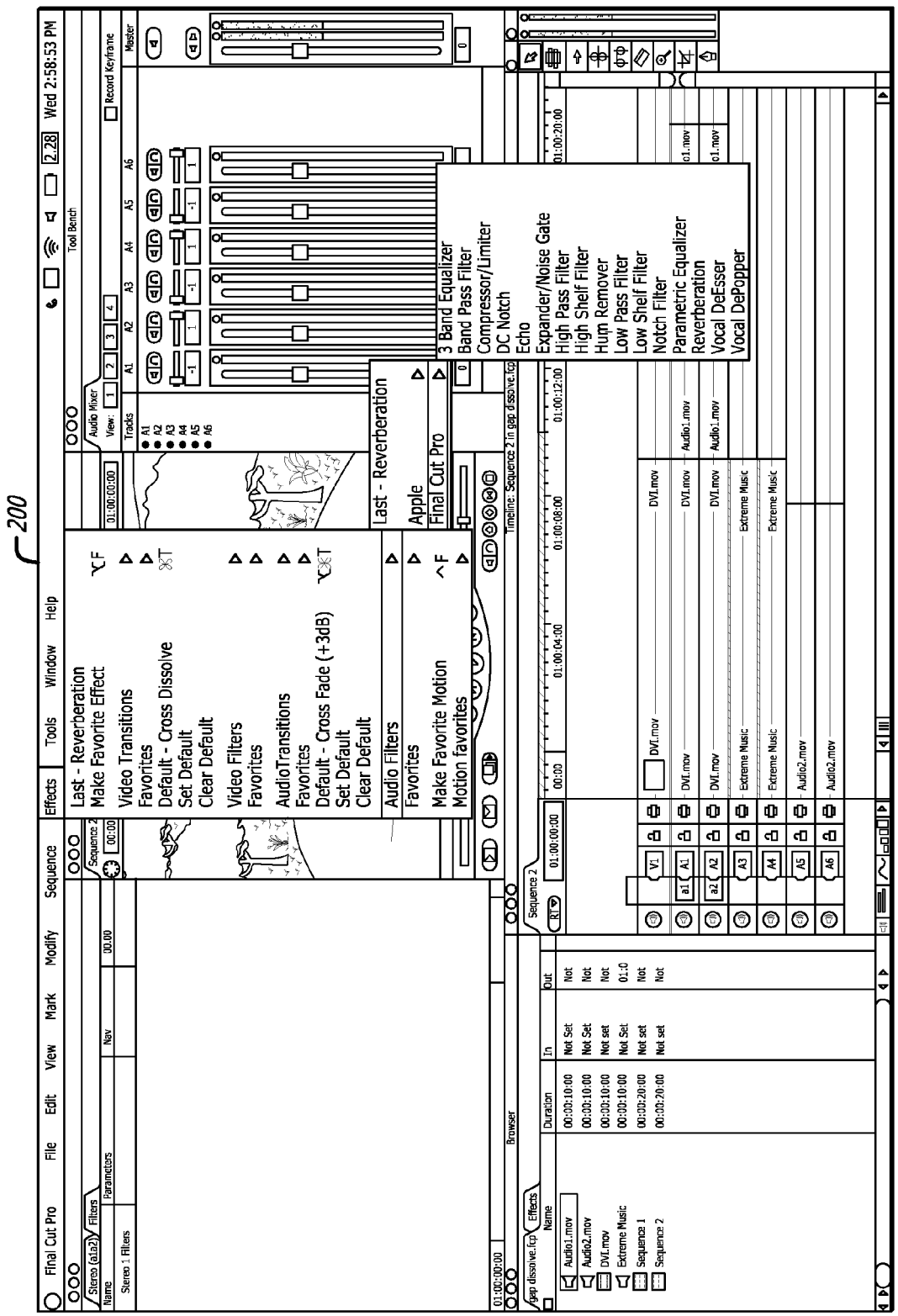

As mentioned above, a user can specify a variety of filter operations on an audio item. FIG. 3 illustrates that GUI 200 allows a user to specify a filter operation for an audio item by selecting an audio item (in this case, by clicking on the audio item Audio2.mov) and then selecting an audio filter in the effects menu selection. This figure illustrates numerous filter operations, such as 3 Band Equalizer, Band Pass Filter, Compressor/Limiter, DC Notch, etc.

Figure 4:
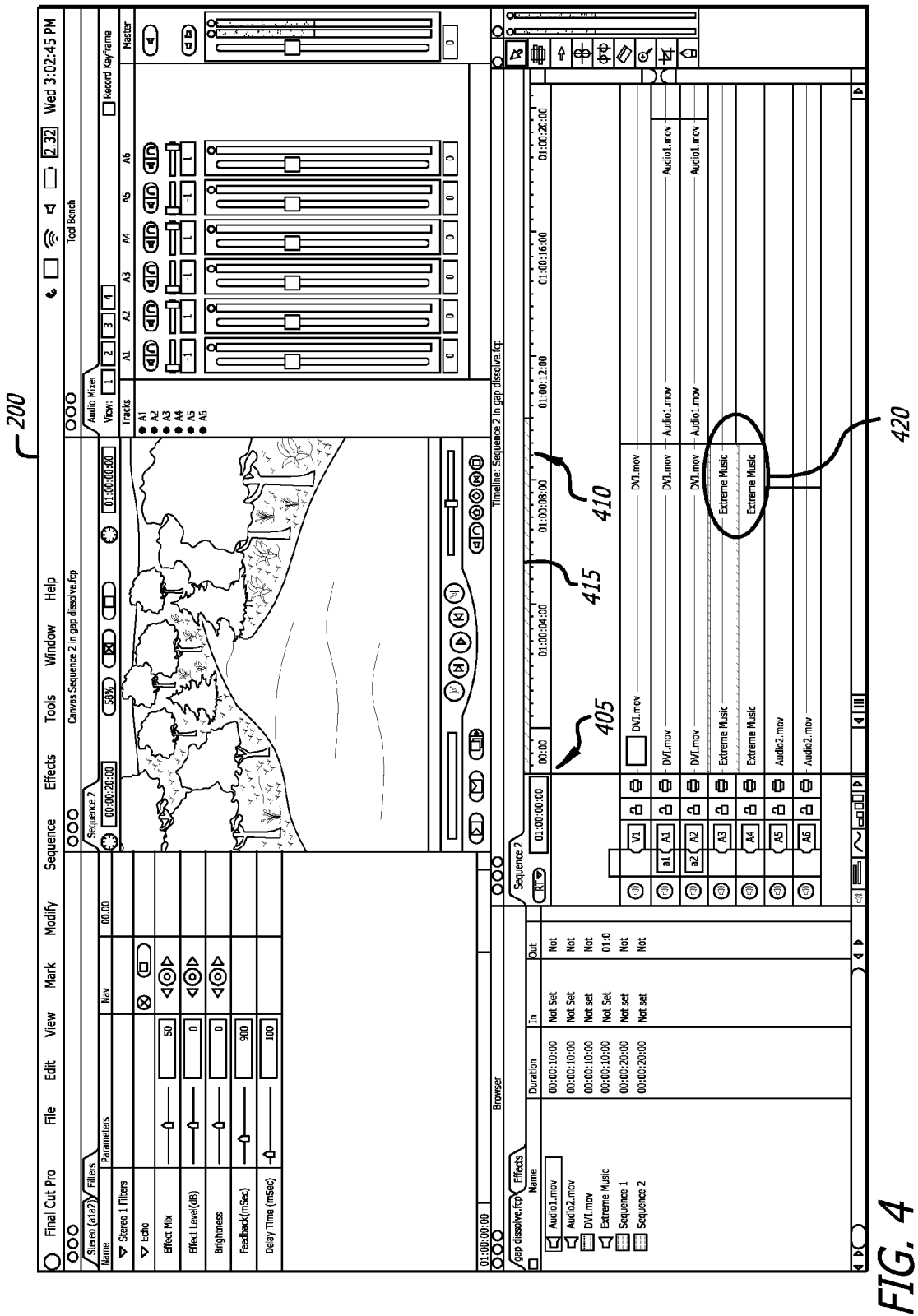

FIG. 4 illustrates the GUI 200 after the user has specified filtering operations for the audio items Audio2.mov and Extreme Music. At this stage, the render status bar 256 is red from position 405 to position 410. This color specifies that the portion of the presentation that is the segment 415 (which is between points 405 and 410) cannot probably be rendered in real-time. This is because the processing power of the computer system is less than the processing resources needed for the filtering operations that are specified for the audio items Audio2.mov and Extreme Music, which overlap in the segment 415. The audio item Audio2.mov completely falls within the segment 415. On the other hand, a portion 420 of the audio item Extreme Music does not overlap with this segment. The red color in the render status bar does not extend over this portion 420 of the audio item Extreme Music, as this portion does not overlap the audio item Audio2.mov and hence does not require processing resources in excess of what the computer system can offer.

Figure 5:
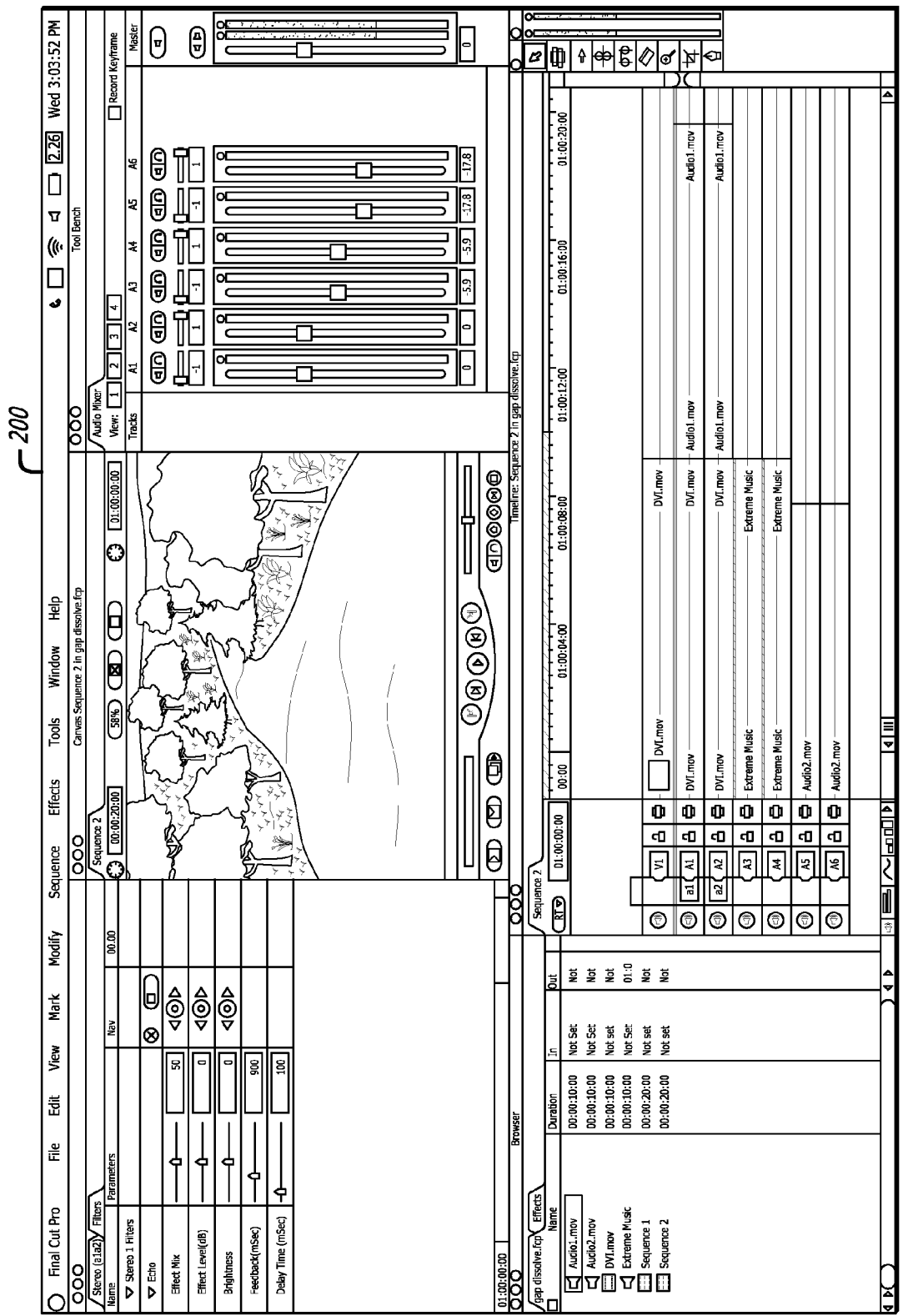

In the sequence of operations illustrated in FIGS. 2-8, the user next adjusts the volume control knobs of the mixer 215. FIG. 5 illustrates these adjustments. In some embodiments, the adjusting of the mixer parameters does not affect the media-editing application's assessment as to whether the resources of the computer system can handle the specified operations. In other words, the application does not cost mixer parameter adjustments in some application, to assess the processing capacity at each segment. Accordingly, the red portion 415 of the render status bar 256 is the same in FIGS. 4 and 5, even though in FIG. 5 the user has modified the mixer parameters.

Figure 6:
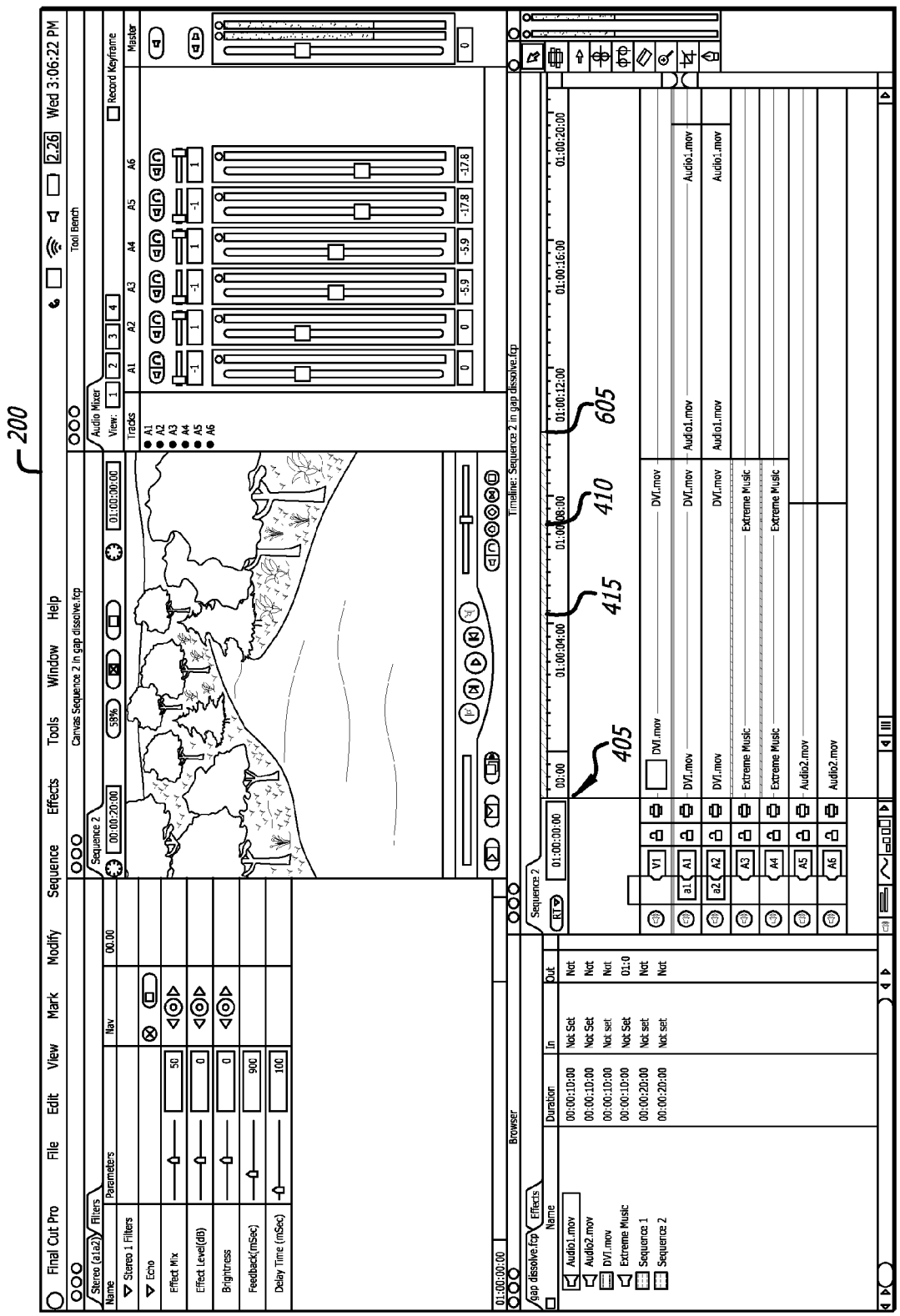

In the sequence of operations illustrated in FIGS. 2-8, the user next directs the application to generate render files for the portions of the audio items that fall in the red zone illustrated in FIG. 5. FIG. 6 illustrates the GUI 200 after this operation. As shown in FIG. 6, the status render bar 256 is no longer red for any segment because, at this stage, there is no segment of the presentation where the specified filter and SRC operations require more processing power than available. Also, at this stage, the portions of the item-level-render bars 254a-254d (of audio items Audio2.mov and Extreme Music) that overlapped segment 415 have changed their color from white to a dark gray. This change of color specifies that item-level render files have been created for these portions of the audio items Audio2.mov and Extreme Music.

As mentioned above, the entire audio item Audio2.mov overlapped with the segment 415, while a portion 420 of the Extreme Music item did not. Hence, a render file is specified for the entire audio item Audio2.mov, while a render file is specified for all of the Extreme Music item except for the portion 420.

Figure 9:
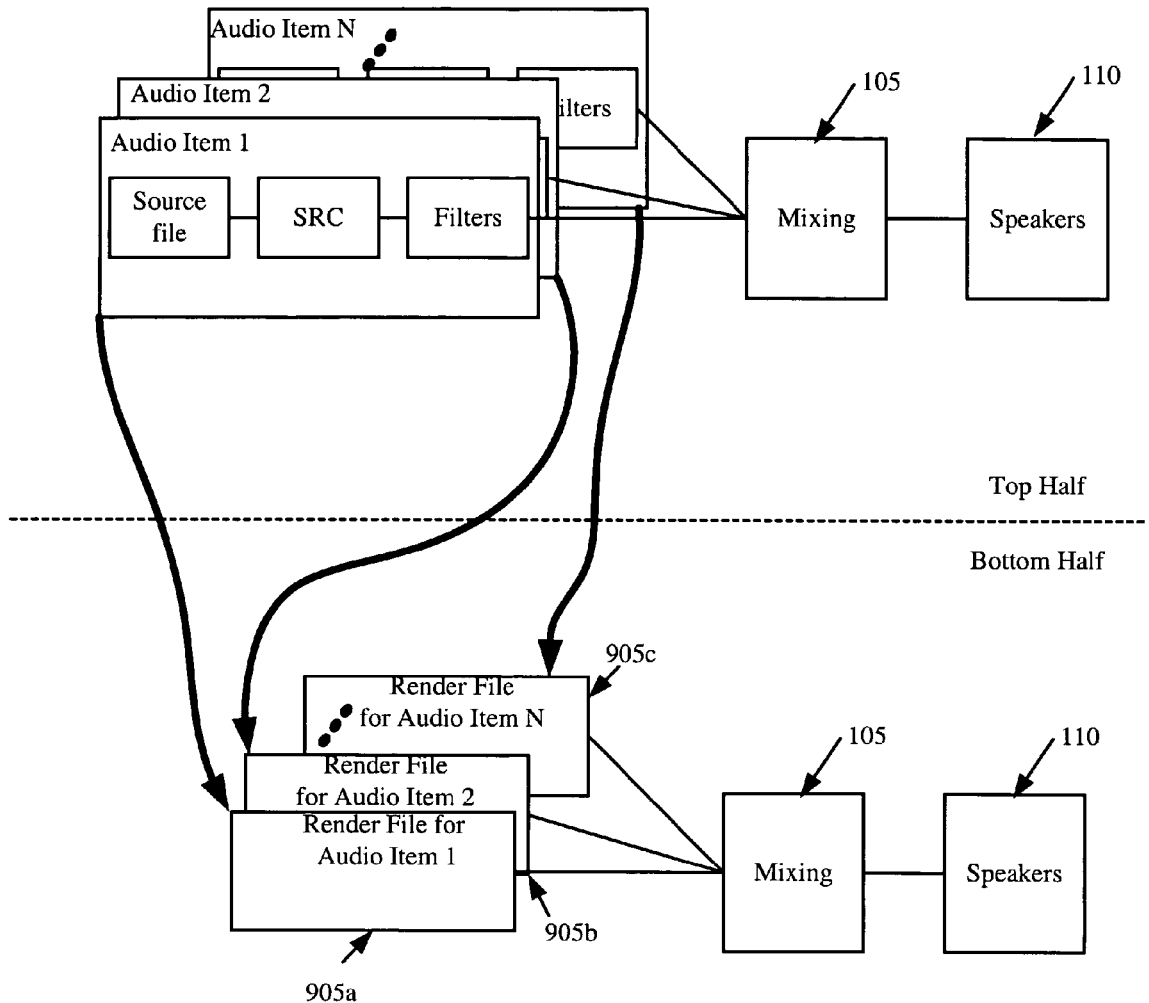
FIGS. 9 and 10 present block diagrams that conceptually illustrate item level rendering.
Figure 10:
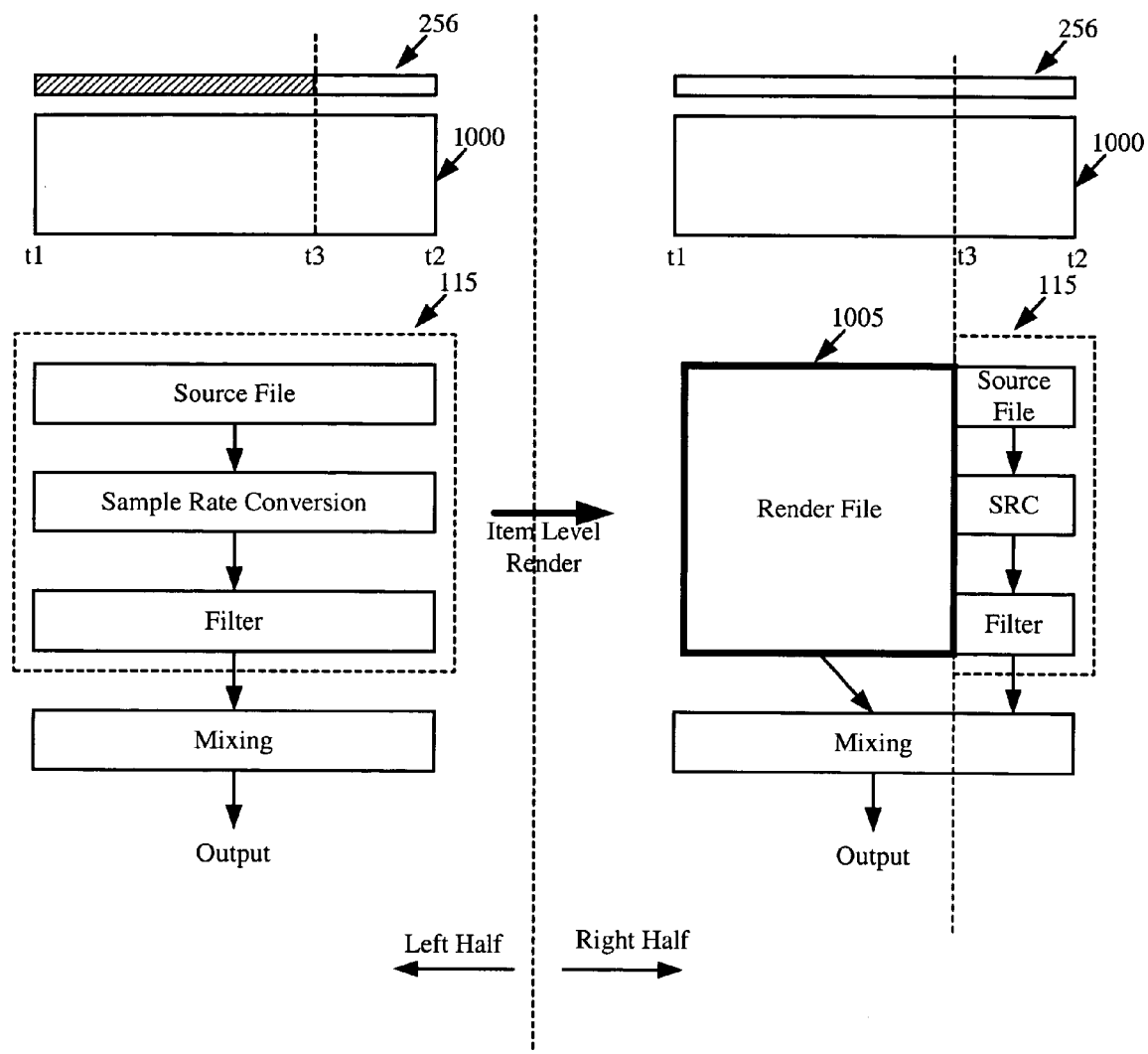

FIGS. 9 and 10 present examples that further illustrate generating a render file and generating such a file for only a portion of an audio item. FIG. 9 illustrates in its top half processing pipelines 115 for several audio items 1 to N. Each processing pipeline involves retrieving audio data from a source file, performing any necessary sample rate conversion, and applying any necessary filter operations. After this processing for each audio item, a mixer 105 is to combine the processed data of all the items and assigns the combined data to different audio channels (e.g., left and right for a stereo presentation) while accounting for the appropriate volume and pan values specified through the mixer. The output of the mixer is then played through the speakers 110.

The bottom half of FIG. 9 illustrates what happens when each of the items 1 to N is item level rendered individually and separately from the other audio items. This rendering generates one render file 905 for each audio item rendered. Each particular audio item's rendered file contains processed audio data that was obtained by (1) retrieving the audio data for the particular audio item from this unit's source file and (2) applying to the retrieved data all the filter and SRC operations that were specified for the particular audio item. As shown in FIG. 9, the data in the rendered files 905 can be supplied to the mixer 105 for mixing. In this manner, the rendered files serve as new defacto source files for the audio items, and eliminate the need to traverse through the processing pipeline 115 in real-time, which, in turn, frees up computation resources for other operations. However, it should be noted that in some embodiments the render files are discarded when new filter or SRC operations are specified for a previously rendered audio item.

FIG. 10 presents an example that illustrates producing a render file for only a portion of an audio item. The left half of this figure illustrates an audio item 1000 and a render status bar 256. It also illustrates that the pipeline processing 115 has to be performed for the entire interval that starts at t1 and ends at t2. The render status bar 256 is red (as indicated by the dash lines) from times t1 to t3, which specifies that in this interval from t1 to t3 the processing power of the computer system has been exceed by the operations specified for the audio item 1000 and other audio items overlapping this item.

The right half of FIG. 10 illustrates the state of the audio item 1000 after the user directs the media-editing application to item-level render this item. As shown in this half, the render status bar 256 is no longer red (as indicated by the absence of the dash lines). Also, in this half, a render file 1005 has replaced the processing pipeline in the interval from time t1 to t3. However, this pipeline 115 still exists in the interval from times t3 to t2.

In FIG. 6, an example of such a partial rendering (i.e., an example of generating a render file for only a portion of an audio item) is the rendering of the Extreme Music audio item. The item-level bar 254c and 254d above this item's bars 230a and 230b are a first color (e.g., dark gray) between 405 and 410, but they are a second color (e.g., green) between 410 and 605, which is the end of this audio item. The first color specifies that an item-level render file has been created for the audio item Extreme Music for the interval between 405 and 410. The second color specifies that no render file have been created for this item for the interval between 410 and 605. In the interval between 410 and 605, the media-editing application will still use a processing pipeline to process the audio data in real-time. Some embodiments generate one render file for all channels (e.g., the left and right channels) of the audio item, while other embodiments generate one render file for each channel.

Figure 7:
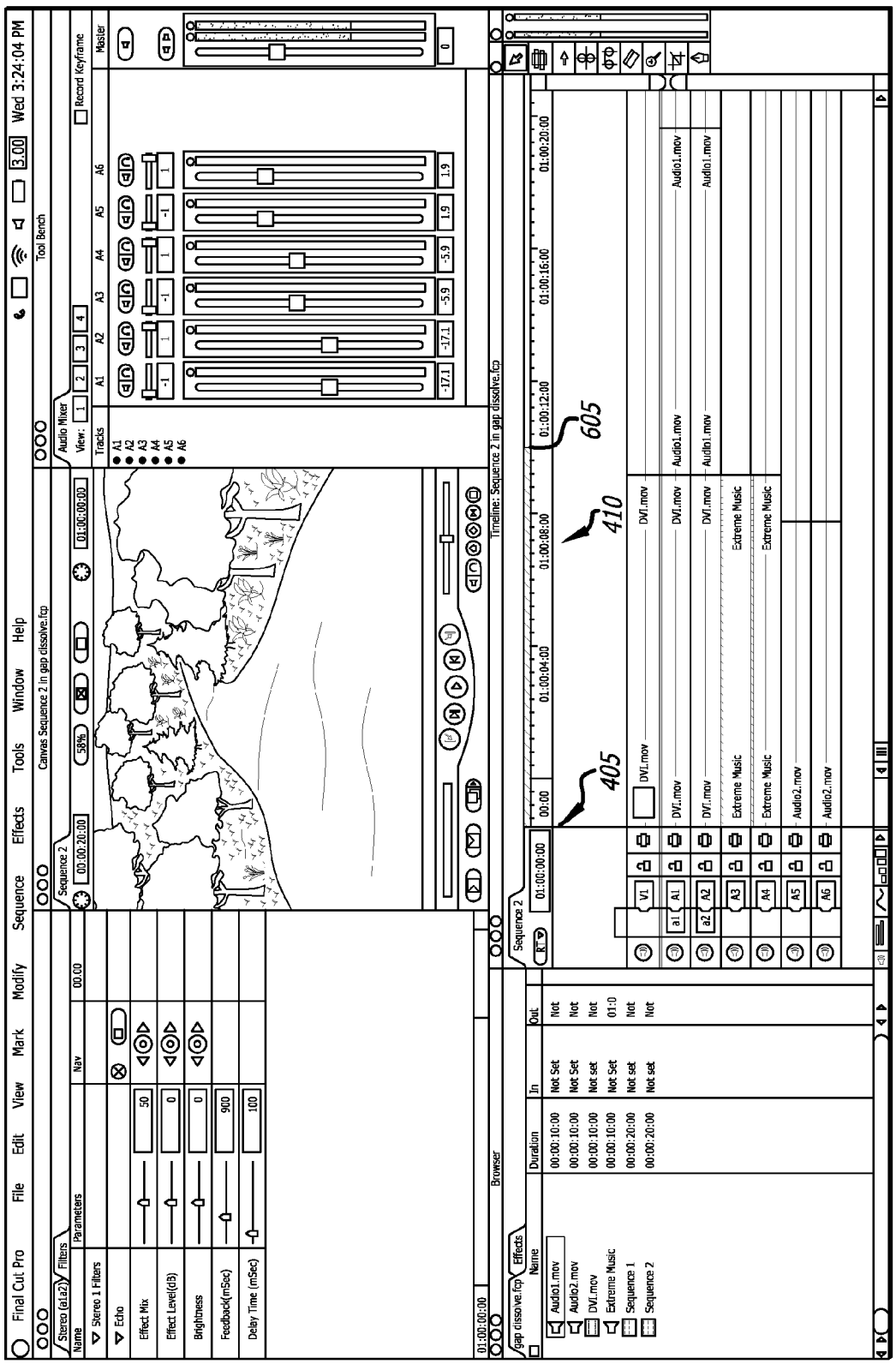

FIG. 7 illustrates one advantage of item level rendering. This figure illustrates that, after the rendering operation of FIG. 6, the mixer parameters (which in this example are the volume levels) can be adjusted. This would not be possible with sequence level rendering as this type of rendering subsumes the mixing in it.

Figure 8:
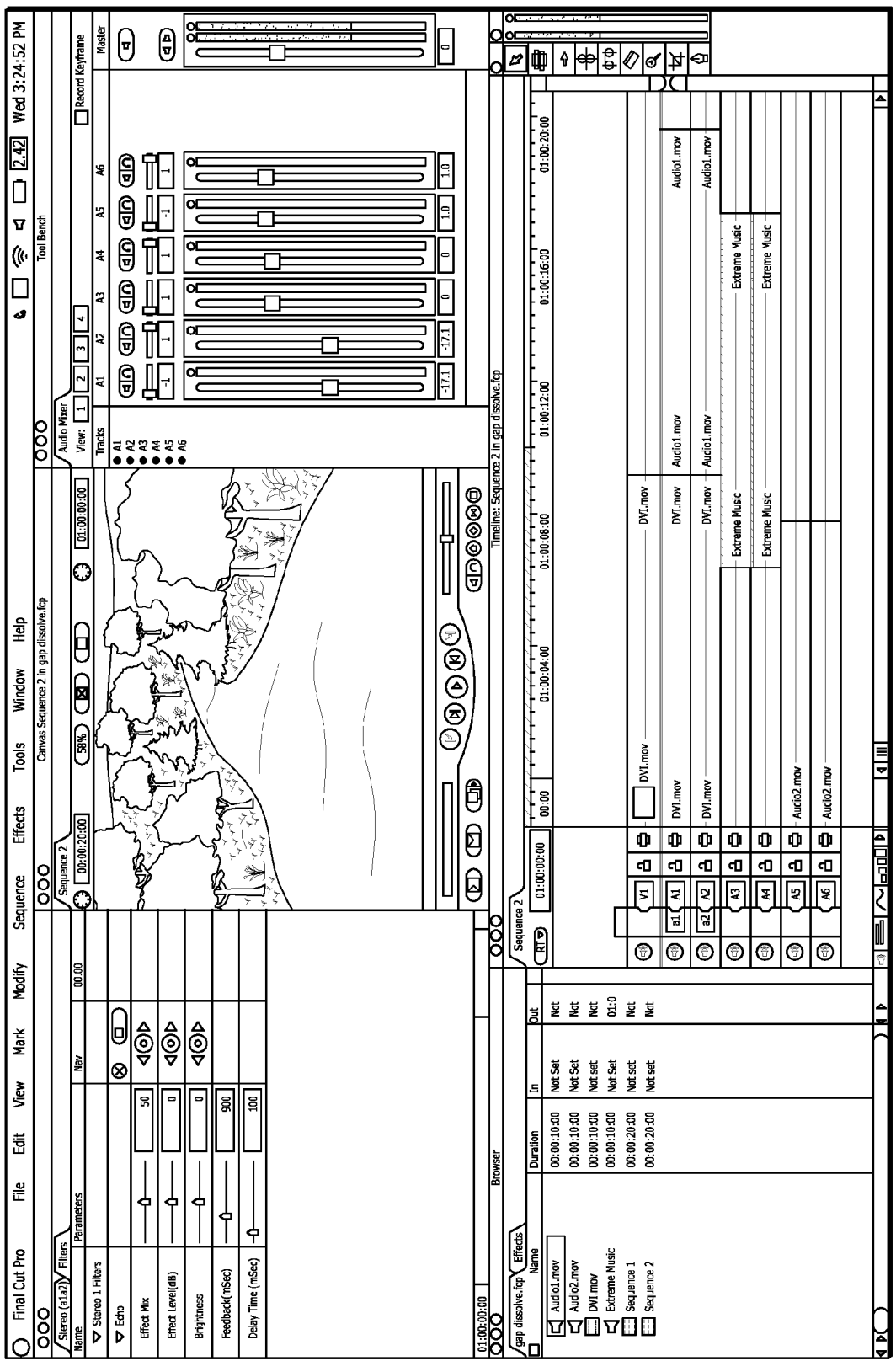

FIG. 8 illustrates another advantage of item level rendering. This figure illustrates that, after the rendering operation of FIG. 6 and volume adjustments of FIG. 7, the rendered audio item (in this case, the Extreme Music item) can be dragged across the timeline. Such movement does not create any problems because item level rendering can account for the fact that audio and video rates are not integer multiples of each other. Item level rendering accounts for this by first always rendering a few extra samples (i.e., rendering long). Second, by rendering each audio item individually, item level rendering allows the media editing application to correctly tailor the number of samples in each audio section to the position of the corresponding video frame in the presentation and to the audio data's source file.

Figure 11:
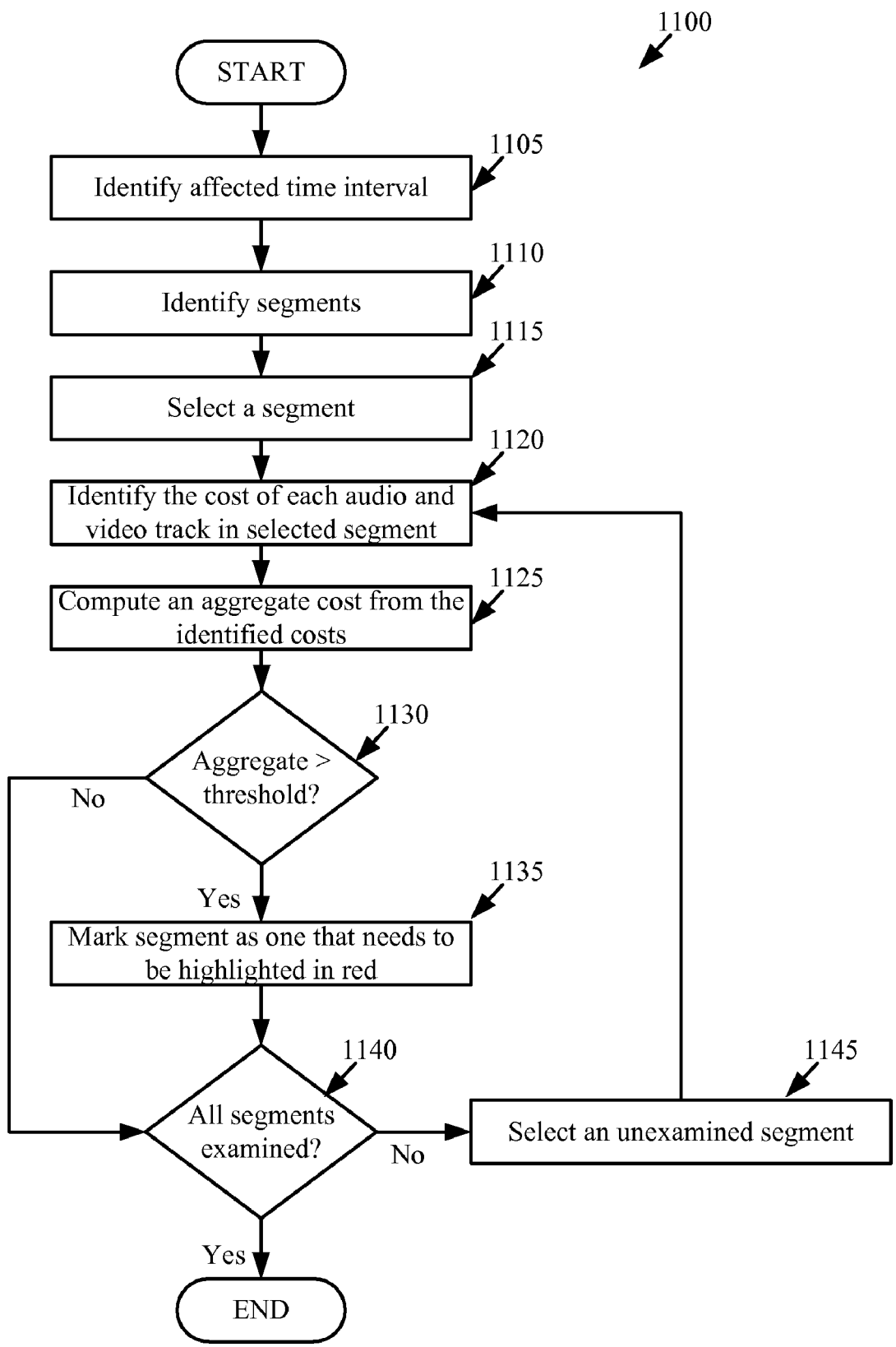
FIG. 11 illustrates a process performed by some embodiments each time a project changes.

FIG. 11 illustrates a process 1100 that the media-editing application performs each time there is a change in the presentation. For instance, this process is performed whenever an audio or video item is added or changed (e.g., moved, assigned new filter operations, etc.) to the presentation. As shown in FIG. 11, the process 1100 initially identifies (at 1105) the time interval affected by the change. It then identifies (at 1110) segments in the identified time interval. A segment is a section of the identified time interval where there is no change in the media presentation, i.e., where all the audio or video components (the video clips, the audio items, the filters, SRC's, etc) and the arrangement of these components remain the same. So, in the example illustrated in FIG. 4, one segment is the interval 415 since the parameters at any point in this interval are identical to the parameters at any other point in this interval. This segment 415 ends at 410 because after 410 the audio item Audio2.mov finishes (i.e., one of the parameters drops out).

After segmenting the affected time interval, the process selects (at 1115) one of the identified segments. It then identifies the cost of each audio item and video clip in the selected segment. For each audio item, the process computes a cost by identifying its filters and SRC's, and summing the cost of its identified filters and SRC's. The cost of filters and SRC's can be pre-tabulated or they can be generated based on the settings of their parameters. Each video clip can be costed by expressing the complexity of processing some of its attributes in terms of audio processing operations, such as filtering, SRC, and/or mixing.

Next, the process sums (at 1125) the costs identified at 1120. It then determines (at 1130) whether the aggregate is greater than a threshold that quantifies the system resources. Some embodiments allow a user to specify the threshold in terms of one of the audio processing parameter (e.g., specify that the threshold equals 8 tracks of mixing). Other embodiments compute this threshold based on the hardware resources of the computer system.

If not, the process transitions to 1140, which will be described below. Otherwise, the process transitions to 1135, where it marks the selected segment as one that needs to be presented in red in the GUI. From 1135, the process transitions to 1140. At 1140, the process determines whether all the identified segments were examined. If not, the process selects (at 1145) an unexamined segment that it identified at 1110. From 1145, the process transitions back to 1120, which was described. Once the process determines (at 1140) that it has examined all the identified segments, it ends.

Figure 12:
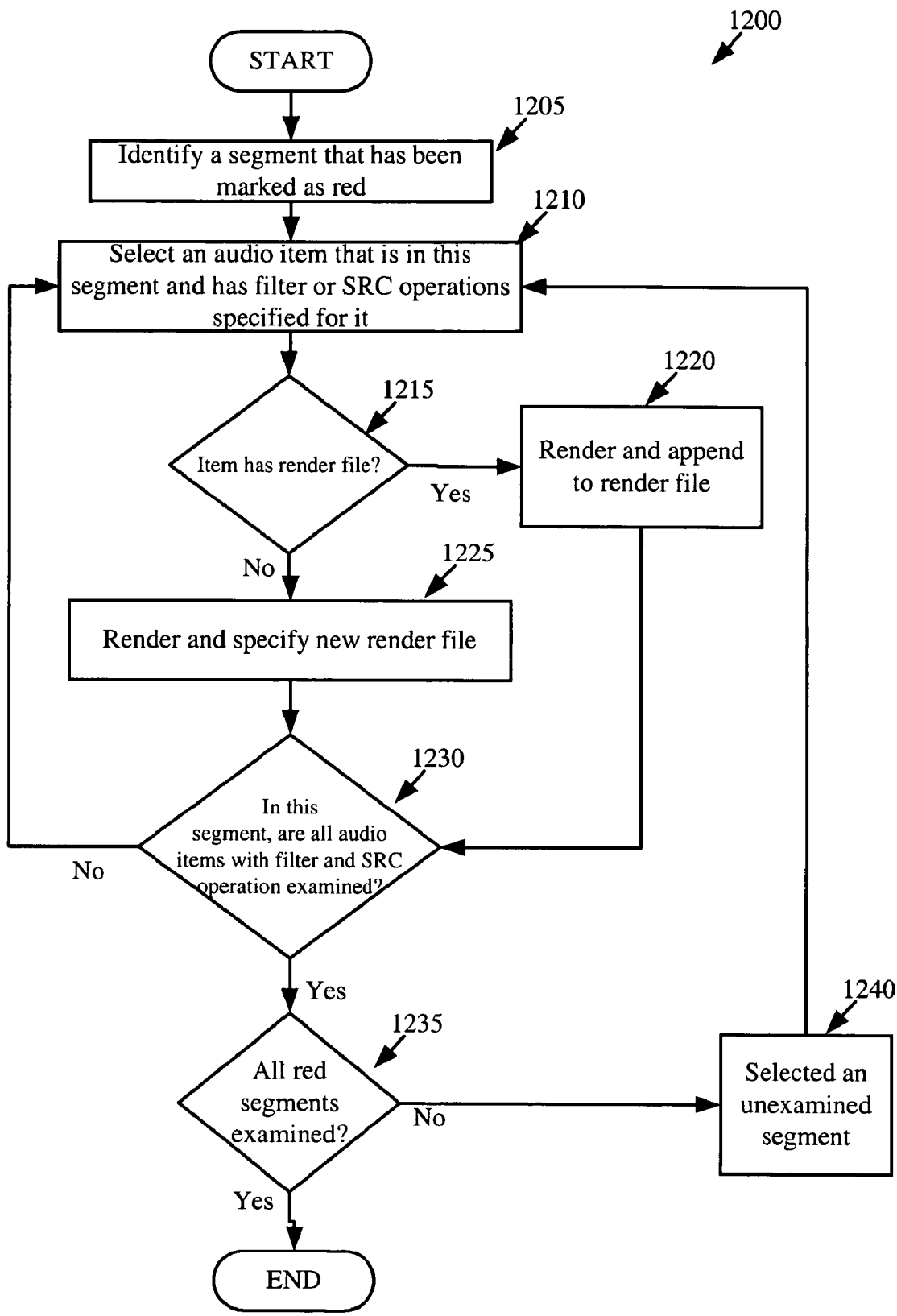
FIG. 12 illustrates a processes for perform pre-processing in some embodiments.

FIG. 12 illustrates a process 1200 that the media editing application performs in some embodiments to item level render certain audio items. A user can direct the application to initiate such a process. Even when directed to perform item level rendering, the application in some embodiments decides to sequence level render the data if it determines that even after the requested item level rendering there would be segments that could not be processed in real-time.

To start item level rendering, the process 1200 identifies (at 1205) a segment that has been marked as red by the process 1100. It then selects (at 1210) an audio item that is in this segment and that has filter or SRC operations specified for it. It should be noted that some embodiments discard a previously defined render file when filter or SRC operations are specified for a portion of an audio item that has a previously defined render file.

At 1215, the process determines whether the selected audio item has a previously specified render file. If so, the process renders (at 1220) all the data within the selected segment and between the selected segment and the boundary of the previously defined render file, and then appends the previously defined render file to include the newly rendered data. For example, in the example illustrated in FIG. 10, the interval from t3 to t2 of audio item 1000 might at some point fall in a segment that is marked red. In this case, this interval is rendered and the results are appended to the rendered file 1005. From 1220, the process transition to 1230, which will be described below.

When the process determines (at 1215) that the selected audio item does not have a previously specified render file, the process renders (at 1225) the portion of the selected audio item that falls into the selected segment and stores this render result in a new render file for the audio item. From 1225, the process transitions to 1230.

At 1230, the process determines whether in the selected segment all audio items with filter and SRC operations have been examined. If not, the process transitions to 1210 to select an unexamined audio item and repeat the subsequent operation, which were described above. Otherwise, the process determines (at 1235) whether it has examined all the segments that were marked red by the process 1100. If not, the process selects (at 1240) an unexamined segment that has been designated as red, and then returns to 1210 to perform the above-described operations for this new segment. When the process determines (at 1235) that it has examined all the red segments, it ends.

Item level rendering has numerous advantages. First, pre-processing of audio items makes more of the resources available for processing more tracks with more effects and more power for video processing. Second, item level rendering does not require the application to re-render all audio items due to a change of filter or SRC parameters for one audio unit. In such a situation, only the affected audio unit has to be re-rendered. Third, item level rendering does not need to be repeated even when the audio items are moved.

Figure 13:
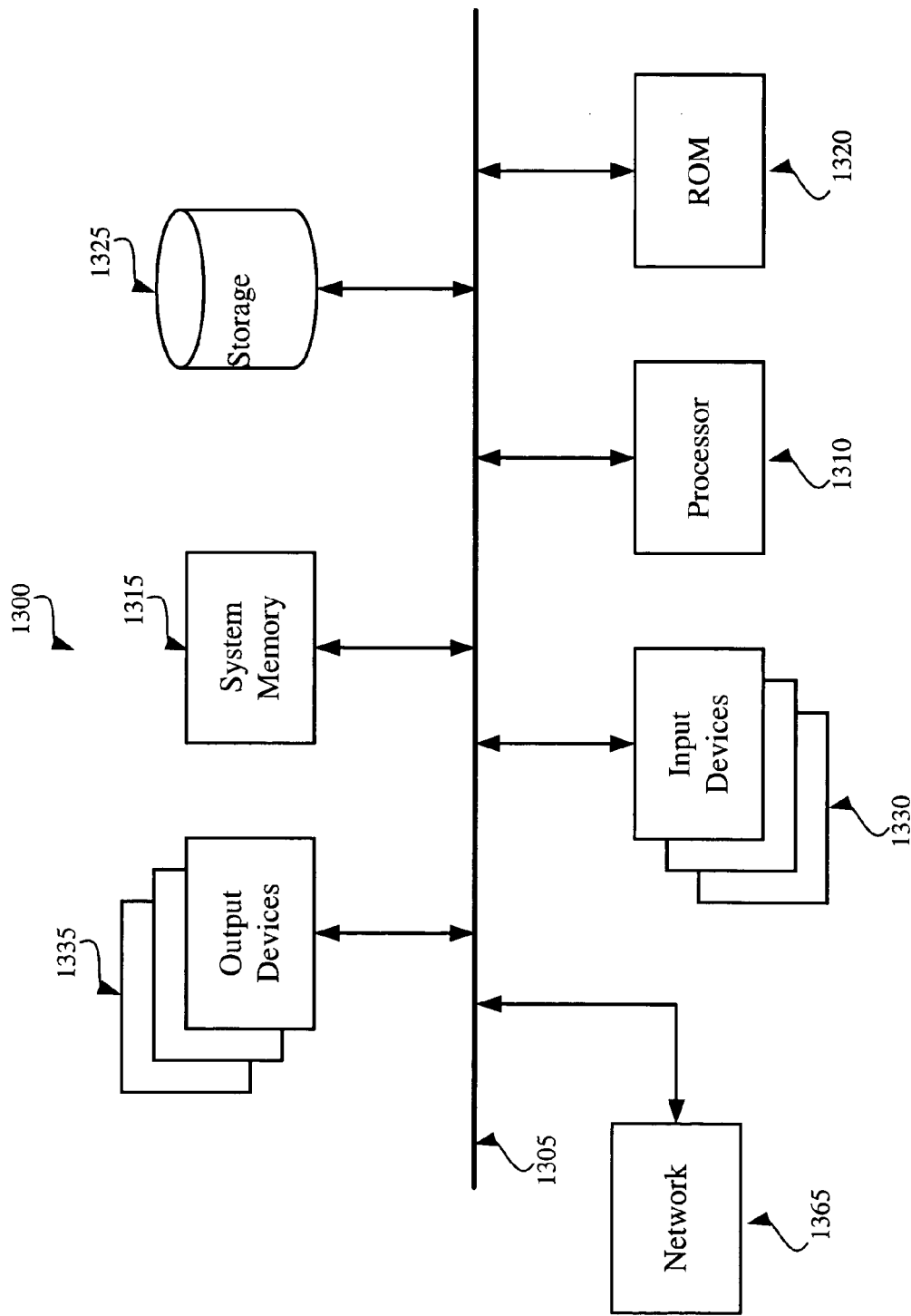
FIG. 13 conceptually illustrates a computer system used in conjunction with the invention.

FIG. 13 presents a computer system with which one embodiment of the invention is implemented. Computer system 1300 includes a bus 1305, a processor 1310, a system memory 1315, a read-only memory 1320, a permanent storage device 1325, input devices 1330, and output devices 1335. The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325.

From these various memory units, the processor 1310 retrieves instructions to execute and data to process in order to execute the processes of the invention. The read-only-memory (ROM) 1320 stores static data and instructions that are needed by the processor 1310 and other modules of the computer system.

The permanent storage device 1325, on the other hand, is read-and-write memory device. This device is a non-volatile memory unit that stores instruction and data even when the computer system 1300 is off. Some embodiments of the invention use a mass-storage device (such as a magnetic or optical disk and its corresponding disk drive) as the permanent storage device 1325.

Other embodiments use a removable storage device (such as a Floppy Disk or Zip® Disk, and its corresponding disk drive) as the permanent storage device. Like the permanent storage device 1325, the system memory 1315 is a read-and-write memory device. However, unlike storage device 1325, the system memory is a volatile read-and-write memory, such as a random access memory. The system memory stores some of the instructions and data that the processor needs at runtime. In some embodiments, the invention's processes are stored in the system memory 1315, the permanent storage device 1325, and/or the read-only memory 1320.

The bus 1305 also connects to the input and output devices 1330 and 1335. The input devices enable the user to communicate information and select commands to the computer system. The input devices 1330 include alphanumeric keyboards and cursor-controllers. The output devices 1335 display images generated by the computer system. For instance, these devices display IC design layouts. The output devices include printers and display devices, such as cathode ray tubes (CRT) or liquid crystal displays (LCD).

Finally, as shown in FIG. 13, bus 1305 also couples computer 1300 to a network 1365 through a network adapter (not shown). In this manner, the computer can be a part of a network of computers (such as a local area network ("LAN"), a wide area network ("WAN"), or an Intranet) or a network of networks (such as Internet). Any or all of the components of computer system 1300 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. The embodiments described above account for the video clips in a segment in assessing the cost of a segment. However, some embodiments might only cost audio items in a segment. Some of these embodiments account for the video clips by allocating less computational resources (i.e., specifying a smaller computational power) for processing audio data. Thus, one of ordinary skill in the art would understand that the invention is not to be limited by the foregoing illustrative details, but rather is to be defined by the appended claims.

I claim:

1. A method of processing a media data stream using a media editing application comprising a user interface ("UI"), the method comprising:
    displaying a plurality of graphical representations associated with media data streams along a timeline;
    receiving user input to pre-process a first media data stream, wherein preprocessing the first media data stream comprises performing at least one particular operation on a section of the first media data stream having a particular duration that is less than an entire duration of the first media data stream;
    performing the particular operation on the section of the first media data stream to produce a second media data stream that is a processed section of the first media data stream; and
    storing the second media data stream independently of the first media data stream, wherein the stored second media data stream is retrieved when the particular operation is later performed on a remaining unprocessed section of the first media data stream.

2. The method of claim 1, wherein the at least one particular operation comprises at least one of a filter operation and a sample rate conversion to perform on said section of the first media data stream.

3. The method of claim 2, wherein the filter operation comprises at least one effect to perform on said section of the first media data stream.

4. The method of claim 1, wherein a section of a third media data stream at least partly overlaps the section of the first media data stream along said timeline, wherein said section of the third media data stream defines a section of the third media data stream that is less than the third media data stream's entire duration, wherein performing the operation comprises performing the operation on the section of the third media data stream to produce a fourth media data stream that is a processed section of the third media data stream, wherein the storing comprises storing the fourth media data stream independently of the third media data stream, wherein the stored fourth media data stream is retrieved when the particular operation is later performed on a remaining unprocessed section of the third media data stream.

5. The method of claim 1, wherein the first media data stream is stored within a first file and the second media data stream is stored within a second file.

6. The method of claim 1, wherein the first media data stream comprises at least one video data stream, at least one audio data stream, or at least one video data stream and at least one audio data stream.

7. The method of claim 1 further comprising performing mixing operations on a plurality of media data streams, wherein performing said mixing operations comprises using the second media data stream when mixing the first section of the first media data stream.

8. A method of defining a media editing application, the method comprising:
    providing a display area for displaying graphical representations associated with media data streams along a timeline, wherein each graphical representation spans an interval of the timeline corresponding to a duration of a media data stream associated with the graphical representation; and
    defining a plurality of processing states associated with different intervals of a particular graphical representation using a plurality of different appearances,
    wherein a first appearance for a particular interval of the particular graphical representation indicates that the particular interval has been preprocessed and a second appearance for the particular interval indicates that the particular interval has not been preprocessed.

9. The method of claim 8, wherein the first appearance for the particular interval of the particular graphical representation further indicates that the particular interval exceeds a threshold and the second appearance for the particular interval further indicates that the particular interval does not exceed the threshold.

10. The method of claim 9, wherein the threshold comprises a particular processing power of a computer system.

11. The method of claim 10, wherein the particular processing power specifies a real-time processing power of the computer system.

12. The method of claim 10, wherein the particular interval exceeds the threshold when a cost associated with at least one operation applied to said particular interval exceeds the particular processing power of the computer system.

13. The method of claim 12, wherein said cost quantifies the processing power needed to perform the at least one operation.

14. The method of claim 12, wherein each operation comprises a pre-tabulated cost.

15. The method of claim 12, wherein the cost specifies a plurality of costs, each of the plurality of costs is associated with a different operation applied to said particular interval.

16. A method of defining a media editing application, the method comprising:
    providing a display area for displaying graphical representations associated with media data streams along a timeline, wherein each graphical representation spans an interval of the timeline corresponding to a duration of a media data stream associated with the graphical representation; and
    defining a plurality of processing states associated with different intervals of a particular graphical representation using a plurality of different appearances,
    wherein a first appearance for a particular interval of the particular graphical representation indicates that an operation has been applied to the particular interval and a second appearance indicates that no operations have been applied to the particular interval.

17. The method of claim 16 further comprising providing a user interface item to initiate preprocessing of the particular interval when the particular interval has the first appearance, wherein after preprocessing, said particular interval has a third appearance.

18. The method of claim 16, wherein the different appearances comprise different colors within the graphical representations.

19. A method of performing a media editing operation, the method comprising:
displaying a graphical representation associated with a media data stream along a timeline by using a first appearance, the graphical representation spanning an interval of the timeline corresponding to a duration of a media data stream associated with the graphical representation;
receiving selection of an operation to apply to the media data stream to only a first portion of the duration; and
modifying the graphical representation to have a second appearance for the first portion of the duration, while maintaining the first appearance of the graphical representation of the media stream for a second remaining portion of the duration.

20. The method of claim 19, wherein the operation comprises a preprocessing operation that applies at least one filter operation to the first portion of the duration.

21. The method of claim 19, wherein the operation comprises a preprocessing operation that applies at least one sample rate conversion operation to the first portion of the duration.

22. The method of claim 19, wherein the operation comprises at least one filter operation to apply to the first portion of the duration.

23. The method of claim 19, wherein the operation comprises at least one sample rate conversion operation to apply to the first portion of the duration.

24. The method of claim 19, wherein the first and second appearances comprise different colors within the graphical representation.

25. A computer readable medium storing a computer program that includes a user interface ("UI"), said computer program for creating a multimedia presentation and comprising sets of instructions for:
displaying a plurality of graphical representations associated with media data streams along a timeline;
receiving user input to perform at least one operation to apply to at least one particular media stream up to a particular instance in time in the timeline, said instance defining a section of a particular media data stream, wherein said section comprises a duration that is less than an entire duration of the particular media data stream;
performing the operation on the section of the particular media data stream to produce a processed section of the particular media data stream;
storing the processed section independently of the particular media data stream; and
modifying an appearance of a particular graphical representation associated with the particular media data stream, wherein the modified appearance has a first appearance which indicates that the section of the particular media data stream has been preprocessed and a second appearance which indicates that a remaining section of the particular media data stream has not been preprocessed.

26. The computer readable medium of claim 25, wherein the first appearance further indicates that that the section of the particular media data stream exceeds a threshold and the second appearance further indicates that the remaining section of the particular media data stream does not exceed the threshold.

27. A computer readable medium storing a computer program that includes a user interface ("UI"), said computer program for creating a multimedia presentation and comprising sets of instructions for:
displaying a plurality of graphical representations associated with media data streams along a timeline;
receiving user input to perform at least one operation to apply to at least one particular media stream up to a particular instance in time in the timeline, said instance defining a section of a particular media data stream, wherein said section comprises a duration that is less than an entire duration of the particular media data stream;
performing the operation on the section of the particular media data stream to produce a processed section of the particular media data stream;
storing the processed section independently of the particular media data stream; and
modifying an appearance of a particular graphical representation associated with the particular media data stream, wherein the modified appearance has a first appearance which indicates that the one operation has been applied to the section of the particular media data stream and a second appearance which indicates that the one operation has not been applied to a remaining section of the particular media data stream.

28. The computer readable medium of claim 27, wherein the particular media data stream is a first media data stream, wherein a second media stream at least partly overlaps the first media data stream along a duration represented by said timeline, wherein said instance in time further defines a section of the second media data stream that is less than the second media data stream's entire duration, wherein the set of instructions for performing the operation further comprises a set of instructions for performing the operation on the section of the second media data stream to produce a processed section of the second media data stream, wherein the set of instructions for storing further comprises a set of instructions for storing the processed section of the second media data stream independently of the second media data stream.

29. The computer readable medium of claim 28, wherein the set of instructions for storing further comprises a set of instructions for storing the processed section of the first media data stream independently of the processed section of the second media data stream.

30. The computer readable medium of claim 28, wherein the computer program further comprises a set of instructions for combining the processed sections of the first and second media data streams in one combined media data stream.

31. A computer readable medium storing a computer program for editing media data streams, said computer program for execution by at least one processor and comprising sets of instructions for:
displaying, in a display area, graphical representations associated with media data streams along a timeline, wherein each graphical representation spans an interval of the timeline corresponding to a duration of a media data stream associated with the graphical representation; and
defining a plurality of processing states associated with different intervals of a particular graphical representation using a plurality of different appearances,
wherein a first appearance for a particular interval of the particular graphical representation indicates that the particular interval has been preprocessed and a second appearance for the particular interval of the particular graphical representation indicates that the particular interval has not been preprocessed.

32. The computer readable medium of claim 31, wherein the first appearance for the particular interval of the particular graphical representation further indicates that the particular interval exceeds a threshold and the second appearance for the particular interval of the particular graphical representation further indicates that the particular interval does not exceed the threshold.

33. A computer readable medium storing a computer program for editing media data streams, said computer program for execution by at least one processor and comprising sets of instructions for:

displaying, in a display area, graphical representations associated with media data streams along a timeline, wherein each graphical representation spans an interval of the timeline corresponding to a duration of a media data stream associated with the graphical representation; and defining a plurality of processing states associated with different intervals of a particular graphical representation using a plurality of different appearances, wherein a first appearance for a particular interval of the particular graphical representation indicates that an operation has been applied to the particular interval and a second appearance for the particular interval of the graphical representation indicates that no operations have been applied to the particular interval.

\* \* \* \* \*

UNITED STATES PATENT AND TRADEMARK OFFICE
CERTIFICATE OF CORRECTION

| | | |
|---|---|---|
| PATENT NO. | : 7,778,823 B2 | Page 1 of 1 |
| APPLICATION NO. | : 11/963754 | |
| DATED | : August 17, 2010 | |
| INVENTOR(S) | : Kenneth M. Carson | |

It is certified that error appears in the above-identified patent and that said Letters Patent is hereby corrected as shown below:

On the Title page, in the field (57), in "Abstract", in column 2, line 7, delete "processes" and insert -- processed --, therefor.

In column 2, line 47, delete "processes" and insert -- processed --, therefor.

In column 3, line 3, delete "processes" and insert -- process --, therefor.

Signed and Sealed this
Twenty-second Day of November, 2011

David J. Kappos
*Director of the United States Patent and Trademark Office*